R. L. JOHNSON.
VEHICLE SIGNALING CRANE.
APPLICATION FILED MAR. 15, 1920.
1,377,488.
Patented May 10, 1921.
2 SHEETS—SHEET 1.
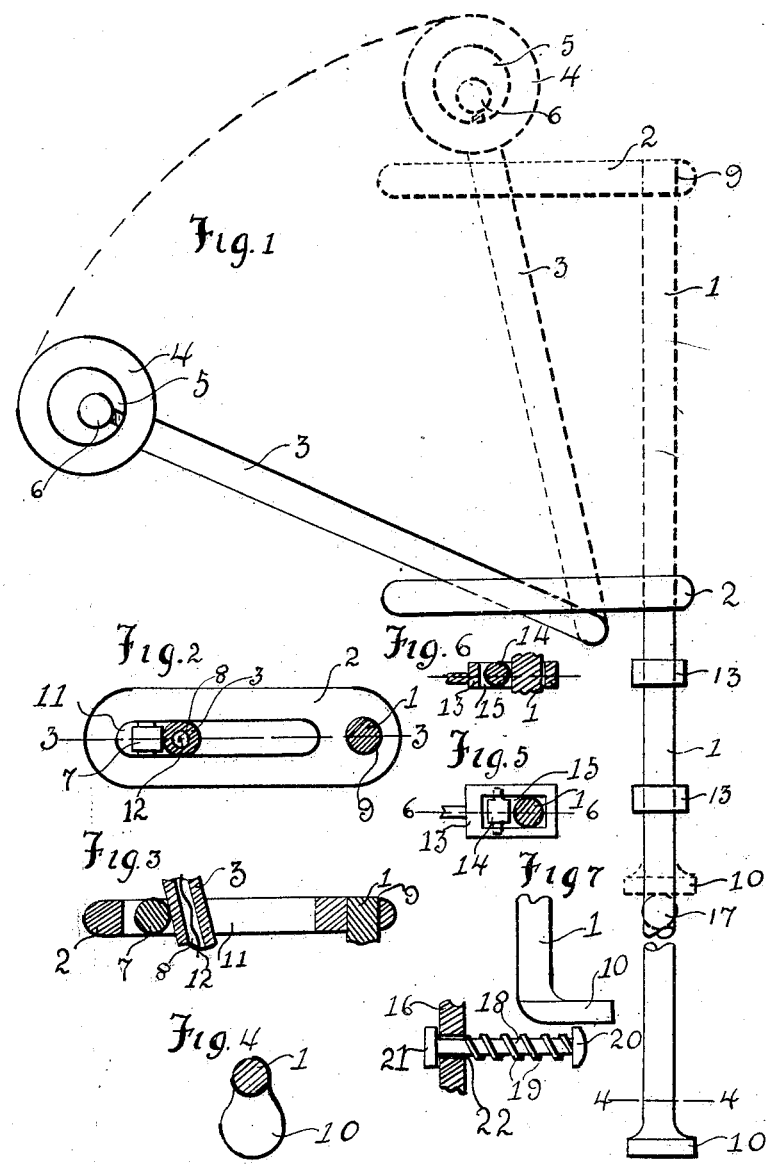

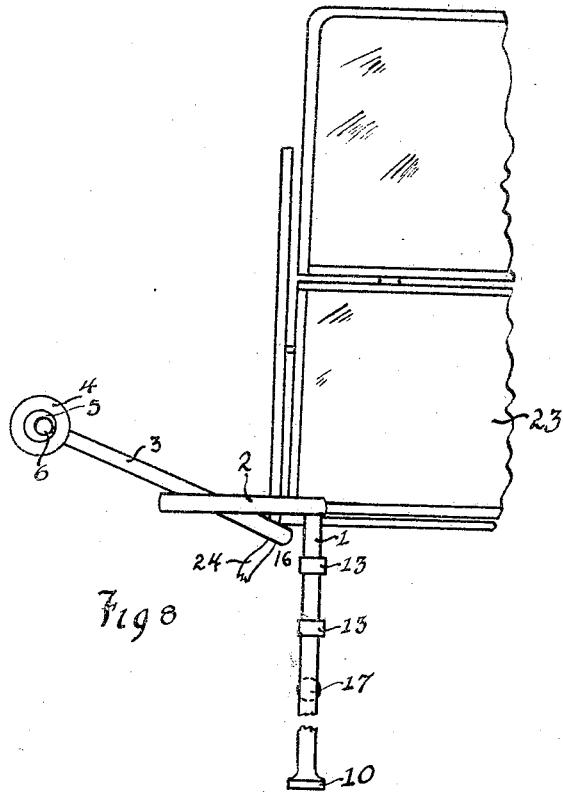

UNITED STATES PATENT OFFICE.

ROSAMOND L. JOHNSON, OF PORT ORCHARD, WASHINGTON.

VEHICLE SIGNALING-CRANE.

1,377,488.  Specification of Letters Patent.  Patented May 10, 1921.

Application filed March 15, 1920. Serial No. 365,964.

*To all whom it may concern:*

Be it known that I, ROSAMOND L. JOHNSON, a citizen of the United States, and a resident of Port Orchard, in the county of Kitsap and State of Washington, have invented certain new and useful Improvements in Vehicle Signaling-Cranes, of which the following is a specification.

This invention relates to improvements in vehicle signaling cranes, and has for its principal objects to provide a device of that character which permits the signaling to persons outside the vehicle the driver's intention of deviating from the straight course, or of changing speed; the use of both hands for directing the vehicle while turning; the quick exposure and withdrawal of the signal; and the discontinuance of the present signal—the driver's own hand and arm, thrust from the side of the vehicle.

It is also an object of this invention to furnish such a signaling crane permanently attached to the vehicle in such a way as to be always and easily available for use.

To secure these and other objects of my invention I have provided the improved details of structure, whose preferred forms are illustrated in the accompanying drawings; therein—

Figure 1 is a front view of a vehicle signaling crane, constructed in accordance with my invention, showng the crane in signaling position, and also,—in the dotted extension of the figure,—as it appears when withdrawn.

Fig. 2 is a horizontal view of the top of the arm 2, including a cross section of the arm 3, shown on the same plane as the top of arm 2.

Fig. 3 is a vertical section of arm 2 and its contents, on the line 3—3 of Fig. 2.

Fig. 4 is a horizontal section looking downward on the line 4—4 of Fig. 1.

Fig. 5 is a horizontal view of the top of the staple 13 and roller 15, and shows a cross section of shaft 1, cut on the same plane as the top of staple 13.

Fig. 6 is a vertical section of staple 13, roller 14, and shaft 1, on the line 6—6 of Fig. 5.

Fig. 7 is a side view of stop 17, base of shaft 1, with control 10, and section of supporting part of vehicle, 16.

Fig. 8 is a view of the signaling crane and a portion of the vehicle, to show the relationship.

23 is the windshield of the vehicle.

24 is the side of the vehicle.

The device is mounted within the vehicle, the arm 3 projecting over its side 24, to display the signals.

Throughout the drawings a given numeral relates always to the same part.

1 indicates a vertical shaft, the upper end of which fits and is fastened in a vertical aperture 9, in arm 2, and whose lower end expands into a control 10. It is the function of the shaft 1 to engage and operate the arm 3, and the attached signal plate and electric light bulb, 4 and 6, through the agency of, and by means of raising and lowering, arm 2.

2 is a horizontal arm formed of a flat piece, with a vertical aperture 9 near the inner end, to receive the upper end of the vertical shaft 1, and a vertical slot 11, extending longitudinally inward from a point near its outward end; in this slot 11, at its outer end, is mounted a roller 7.

Through this slot 11 extends the arm 3, which is a hollow shaft, pivotally attached at its lower end to the supporting part of the vehicle 16, and bearing on its upper, free end a signaling plate 4.

This arm 3 bears upon the roller 7, which revolves as the apparatus is raised or lowered, thus reducing the friction.

4 is the signaling plate, consisting of a flat disk containing a horizontal aperture 5 through its center; in this aperture 5 and attached to the plate 4 is mounted an electric light bulb 6 for night service. The electric light bulb is fed by a wire 12 reaching it through the central cavity 8 in arm 3 and an extension thereof in plate 4.

13 designates staples or rings securing the vertical shaft 1 to the supporting part of the vehicle 16. The shaft 1 extends through the vertical apertures 15 in the staples 13 and bears on the rollers 14 which are mounted in these apertures to reduce friction.

When the vehicle is being driven by dark and the signaling plate is invisible, the electric light 6 is used to render it visible, and is itself a part of the signal.

17 is a stop intended to retain the signaling crane in its elevated position; it consists of a pin 18, working in a horizontal aperture 22 in the supporting part of the vehicle 16 (see Figs. 1 and 7); buttons, 20 and 21, at the inner and outer ends, respectively, of pin 18; and a spiral spring 19 coiled around the pin.

In Fig. 8 is a view forward from the driver's station, showing the vehicle signaling crane, in signaling position, secured within the vehicle, and between the driver's station and the front part of the car, and behind the windshield, 23. 24 is the side of the vehicle 17, over it project the arms 2 and 3 to display the signal. A reversed vehicle signaling crane is to be used at the opposite side of the car.

16 is the part of the vehicle below the windshield, 23, that supports the signaling crane and the stop 17, Figs. 1, 7, and 8.

When not in use, the crane is in the elevated position shown by the dotted extension in Fig. 1. If there is a contemplated change of the speed or direction of the vehicle, the crane is brought into operation as follows,—the stop 17 is pushed inward to free the shaft 1, the control 10 is engaged by the driver and moved vertically downward; as the shaft 1 is lowered, the attached arm 2 is also vertically lowered permitting the free end of arm 3 and the attached signal plate and light to swing, by force of gravity, laterally downward until it assumes the position indicated by the solid lines in Fig. 1; the signaling plate 4 and the electric light bulb are now extended beyond the side of the vehicle, and in view of persons on that side of the vehicle or at its front or rear; after the change has been completed and the vehicle again is directed on a straight course at uniform speed the signal is withdrawn by moving vertically upward the shaft 1; this vertically elevates the arm 2, actuating arm 3, and carrying its free end with the attached signals upward and inward until the device has reassumed its original position, as indicated by the dotted lines of Fig. 1. This movement, upward and downward, is facilitated by the revolution of the friction reducing rollers 7 and 14, as they are borne upon by the arm 3 and shaft 1. When the shaft 1 reaches its height the spiral spring 19 presses the stop 17 outward until it is under control 10; when the stop 17 has been pushed inward and shaft 1 lowered, shaft 1 is directly in the outward path of the pin 18 and holds it until the signaling crane has again been elevated; as soon as the control 10 has been raised above the level of the stop 17 the stop reassumes its position under the control 10; it then holds the signaling crane in the elevated position. The button 20 retains the spring 19 on the pin 18, and the button 21 secures the pin in the aperture 22, of supporting part of vehicle 16 (Fig. 7).

Such a device will afford, among other things, a simple, quickly adjusted means to signal a contemplated change of course or speed of a vehicle, and will add to the safety of the occupants thereof and of all patrons of the streets and roads.

After this description of my invention, what I claim as new and desire to protect by Letters Patent is—

1. A vehicle signaling crane of the character described, comprising a signal plate, an electric light bulb attached to the plate, an arm composed of a hollow shaft attached to the signal plate, and pivotally attached to the supporting part of the vehicle, an electric light wire to feed the bulb passing through the central cavity of said shaft, an arm to engage and actuate said shaft, a longitudinal slot in said arm, through which passes the shaft bearing the signal, and means for actuating them.

2. A vehicle signaling crane of the character described, comprising a signal plate, an electric light bulb attached to the plate, an arm composed of a hollow shaft attached to the signal plate, and pivotally attached to the supporting part of the vehicle, an electric wire to feed the bulb passing through the central cavity of said shaft, an arm to engage and actuate said shaft, a longitudinal slot therein through which passes the shaft bearing the signal, and a friction reducing roller mounted in the slot to engage the shaft, and means for actuating them.

3. A vehicle signaling crane of the character described, comprising a signal plate, an electric light bulb attached to the plate, an arm composed of a hollow shaft attached to the plate, and pivotally attached to the supporting part of the vehicle, an electric wire to feed the bulb passing through the central cavity of said shaft, an arm to engage and actuate said shaft, a longitudinal slot in said arm through which passes the shaft bearing the signal, a friction reducing roller mounted in the slot to engage the shaft, a shaft attached to the slot containing arm to actuate it, and means for actuating them.

4. A vehicle signaling crane of the character described, comprising a signal plate, an electric light bulb attached to the plate, an arm composed of a hollow shaft attached to the signal plate and pivotally attached to the supporting part of the vehicle, an electric wire to feed the bulb passing through the central cavity of said shaft, an arm to engage and actuate said shaft, a longitudinal slot in said arm through which passes the shaft bearing the signal, a friction reducing roller mounted in the slot to engage the shaft, a shaft attached to the slot-containing arm to actuate it, a control formed by the expanding base of said shaft, and means for actuating them.

5. A vehicle signaling crane of the character described, comprising a signal plate, an electric light bulb attached to the plate, an arm composed of a hollow shaft attached to the plate and pivotally attached to the supporting part of the vehicle, an electric wire to feed the bulb passing through the central cavity of said shaft, an arm to engage and actuate said shaft, a longitudinal slot in said arm through which passes the shaft bearing the signal, a friction reducing roller mounted in the slot to engage the shaft, a shaft attached to the slot-containing arm to actuate it, a control formed by the expanding base of said shaft, means, as rings or staples, to attach this latter shaft to the supporting part of the vehicle, said shaft passing through the apertures in the rings or staples, friction reducing rollers mounted in the apertures of the rings or staples to engage the shaft, and permit longitudinal movement thereof.

6. A vehicle signaling crane of the character described, comprising a signal plate, an electric light bulb attached to the plate, an arm composed of a hollow shaft attached to the signal plate and pivotally attached to the supporting part of the vehicle, an electric wire to feed the bulb passing through the central cavity of said shaft, an arm to engage and actuate said shaft, a longitudinal slot in said arm through which passes the shaft bearing the signal, a friction reducing roller mounted in the slot to engage the shaft, a shaft attached to the slot-containing arm to actuate it, a control formed by the expanding base of said shaft, means, as rings or staples, to attach said shaft to the supporting part of the vehicle, said shaft passing through the apertures in the rings or staples, friction reducing rollers mounted in the apertures of the rings or staples to engage said shaft and permit longitudinal movement thereof, and a stop to retain the signaling crane in position.

In testimony whereof I have signed my name to this specification in the presence of two subscribing witnesses.

ROSAMOND L. JOHNSON.

Witnesses:
 FRANK W. CODER,
 LUCETTA E. MOORE.